(12) United States Patent
Killilea et al.

(10) Patent No.: US 8,202,578 B2
(45) Date of Patent: Jun. 19, 2012

(54) CRUSH RESISTANT LATEX TOPCOAT COMPOSITION FOR FIBER CEMENT SUBSTRATES

(75) Inventors: T. Howard Killilea, North Oaks, MN (US); Carl Lewis Cavallin, Albertville, MN (US); Shane Wesley Carter, Brooklyn Park, MN (US); William John Mittelsteadt, Lakeville, MN (US); Glen Otto Vetter, New Hope, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 980 days.

(21) Appl. No.: 11/560,329

(22) Filed: Nov. 15, 2006

(65) Prior Publication Data

US 2007/0110981 A1    May 17, 2007

Related U.S. Application Data

(60) Provisional application No. 60/737,442, filed on Nov. 15, 2005.

(51) Int. Cl.
*B05D 3/02* (2006.01)
(52) U.S. Cl. .................. 427/384; 427/385.5; 427/393.6
(58) Field of Classification Search .................. 427/384, 427/385.5, 393.6
See application file for complete search history.

(56) References Cited

U.S. PATENT DOCUMENTS

| | | | |
|---|---|---|---|
| 4,385,152 A | 5/1983 | Boyack et al. | |
| 5,718,943 A * | 2/1998 | Hsu et al. | 427/136 |
| 6,136,383 A | 10/2000 | Schwartz et al. | |
| 6,762,230 B2 | 7/2004 | Owens et al. | |
| 6,818,697 B2 * | 11/2004 | Zhang et al. | 524/560 |
| 7,049,352 B2 | 5/2006 | Gould et al. | |
| 7,148,270 B2 * | 12/2006 | Bowe | 524/4 |
| 2003/0073778 A1 * | 4/2003 | Zhang et al. | 524/555 |
| 2004/0198903 A1 * | 10/2004 | Madle et al. | 524/800 |
| 2004/0229978 A1 * | 11/2004 | Bowe | 524/2 |
| 2005/0009954 A1 * | 1/2005 | Gebhard et al. | 523/210 |
| 2005/0027079 A1 | 2/2005 | Palmer Lauer et al. | |
| 2006/0135684 A1 | 6/2006 | Killilea | |
| 2006/0135686 A1 | 6/2006 | Killilea et al. | |

FOREIGN PATENT DOCUMENTS

| | | |
|---|---|---|
| EP | 0 623 659 A2 | 11/1994 |
| EP | 0 728 779 B2 | 8/1996 |
| JP | 2003251269 | 9/2003 |

OTHER PUBLICATIONS

DSM NeoResins Technical Information, NeoCryl XK-90, Bulletin XK-90, Jan. 2006, 6 pages, DSM NeoResins Inc., Wilmington, MA, USA.

* cited by examiner

*Primary Examiner* — Robert S Walters, Jr.
(74) *Attorney, Agent, or Firm* — IPLM Group, P.A.

(57) ABSTRACT

A coated fiber cement article in the form of an unattached fiber cement board substrate having a first major surface at least a portion of which is covered with a crush resistant final topcoat composition comprising a multistage latex polymer, and a method for making a crush resistant coated fiber cement article by coating a fiber cement board substrate with such a composition and stacking the coated boards.

14 Claims, 7 Drawing Sheets

CRUSH RESISTANT LATEX TOPCOAT COMPOSITION FOR FIBER CEMENT SUBSTRATES

CROSS-REFERENCE TO RELATED APPLICATION

This application claims priority to U.S. Provisional Application No. 60/737,442 filed Nov. 15, 2005, the entire disclosure of which is incorporated herein by reference.

FIELD

This invention relates to prefinished fiber cement siding.

BACKGROUND

Fiber cement composite siding is a high quality building material that has many advantages over vinyl, aluminum or wood siding. One major advantage is the significantly better durability of fiber cement siding. Fiber cement siding typically includes a substrate made from wood pulp or synthetic fiber mixed with silica, hydraulic cement and water. The mixture is pressed into board form and dried. One or both major surfaces of the siding may be profiled or embossed to look like a grained or roughsawn wood or other building product, or scalloped or cut to resemble shingles. A variety of siding styles or shapes are available, including lap siding, vertical siding, soffit panels, trim boards, shaped edge shingle replicas and stone or stucco replicas, all of which may be collectively referred to as "boards". Fiber cement siding boards are also available in a variety of sizes and thicknesses. For example, vertical siding sheets typically have a width of about 1.2 m (4 ft), lengths of about 2.5 to 3 m (8 to 10 ft) and thicknesses of about 4 to 15 mm (0.16 to 0.59 in). Fiber cement siding boards may be prefinished (e.g., primed or painted) at the factory where they are made, stored in stacks (e.g., in a warehouse at the factory or at a distributor), and delivered to a job site ready for attachment to a building. The resulting prefinished board has a primed or painted appearance immediately upon attachment.

Unfortunately, however, fiber cement siding is a much heavier substrate compared to vinyl, aluminum or wood siding products. While builders and homeowners desire the beauty and convenience of fiber cement siding, the decorative surface of a prefinished board can be visually marred or damaged during storage. If the damaged preapplied finish is merely a primer, then the consequences are not so severe. After attachment to a building, the preprimed board can be coated with a final topcoat, a step that would have been carried out in any event. However, if the damaged preapplied finish is a final topcoat, then at least the damaged portion and often the entire board will have to be refinished. This defeats the purpose of manufacturing boards with a preapplied final topcoat.

One damage mechanism is caused when the heavy boards are stacked atop one other, and the accumulated board weight damages the finish. For example, the primed or painted peaks of an embossed siding surface can be crushed, and the flattened peaks can appear as glossy spots. Manufacturers attempt to reduce such damage by placing pairs of prefinished boards in face-to-face relationship with a protective plastic or paper liner between the prefinished face surfaces. The resulting board pairs may be stacked on a pallet, e.g., at a pallet height of about 30 to about 60 cm (about 1 to about 2 ft), and if the liner has sufficient thickness it may adequately protect the surface of boards within the pallet. However, in order to maximize warehouse capacity a manufacturer or distributor may also stack multiple pallets of siding boards directly atop one another, using spacing planks to provide forklift access between each pallet. The bottom boards in such a multiple pallet stack carry the weight of all the boards that are stacked above them. In tall warehouses the weight against the bottom boards may exceed 6, 8 or even 10 kg/cm$^2$ (85, 113 or even 142 psi), and damage to the finish on such bottom boards can be severe despite the presence of the protective liner. Also, portions of the boards beneath the spacing planks may be subjected to a more concentrated load (viz., pressure) than portions not directly beneath the spacing planks, and localized finish damage may telegraph through one or more boards directly beneath the spacing planks.

From the foregoing, it will be appreciated that what is needed in the art is a pre-finished fiber cement siding product that maintains its factory appearance during storage in multiple pallet stacks, e.g., in tall warehouses. Such siding products and methods for preparing the same are disclosed and claimed herein.

SUMMARY

Surprisingly, we have discovered that a final topcoat composition comprising a multistage latex polymer can withstand the forces that may be imparted during the storage of fiber cement siding products. For example, final topcoat compositions containing a multistage latex polymer having a sufficiently low "soft stage" Tg and a sufficiently high "hard stage" Tg appear to provide a crush-resistant, readily coalesceable final topcoat. The soft stage Tg preferably is such that that the composition will coalesce at a Minimum Film Forming Temperature (MFFT) between about 0 and about 55° C. without requiring more than 10% VOCs for acceptable film formation. The hard stage Tg preferably is such that the coated boards may be stacked on the forklift pallets normally used in fiber cement board manufacturing facilities without exhibiting evidence of crush damage, and more preferably is such that multiple pallets may be stacked atop one another without causing such damage.

Accordingly, in one embodiment the present invention provides a coated fiber cement article comprising an unattached fiber cement board substrate having a first major surface at least a portion of which is covered with a crush resistant final topcoat composition comprising a multistage latex polymer.

In another embodiment the present invention provides a method for making a coated fiber cement article, which method comprises providing an unattached fiber cement board substrate having a first major surface; providing a topcoat coating composition comprising a multistage latex polymer; applying the topcoat coating composition to at least a portion of the first major surface; drying or otherwise hardening the coating composition to form a crush resistant final topcoat; and stacking two or more of the thus-coated boards on a pallet or other horizontal supporting surface.

In further preferred embodiments, a pair of the coated boards is placed in face-to-face relationship with a protective plastic or paper liner between the topcoated surfaces, or a plurality of such pairs are stacked on a fork lift platform to provide a loaded pallet, or multiple pallets loaded with the coated boards are stacked atop one another.

BRIEF DESCRIPTION OF THE DRAWING

Like reference symbols in the various figures of the drawing indicate like elements. The elements in the drawing are not to scale.

DETAILED DESCRIPTION

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably, Thus, for example, a coating composition that contains "an" additive means that the coating composition includes "one or more" additives.

The term "board" refer's to a generally planar component suitable for attachment to a building exterior surface, including lap siding, vertical siding, soffit panels, trim boards, shingle replicas, stone replicas and stucco replicas.

The phrase "chalk resistant" when used with respect to a coating composition means that if the coating composition is applied to and dried or otherwise hardened on a fiber cement board substrate, the coating composition will have a chalk rating not less than 5 (viz., a rating of 5 to 10), more preferably not less than 6 (viz., a rating of 6 to 10) and most preferably not less than 8 (viz., a rating of 8 to 10) when evaluated according to ASTM D 4214 Test Method A using a 5 year vertical exterior exposure in Florida.

The phrase "color change resistant" when used with respect to a coating composition means that if the coating composition is applied to and dried or otherwise hardened on a fiber cement board substrate, the coating composition will change less than 15 Macadam units, more preferably will change less than 10 Macadam units, and most preferably will change less than 8 Macadam units following a 5 year vertical exterior exposure in Florida.

The phrase "crack resistant" when used with respect to a coating composition means that if the coating composition is applied to and dried or otherwise hardened on a fiber cement board substrate, the coating composition will have a crack rating not less than 5 (viz., a rating of 5 to 10), more preferably not less than 6 (viz., a rating of 6 to 10) and most preferably not less than 8 (viz., a rating of 8 to 10) when evaluated according to ASTM D 661 using a 5 year vertical exterior exposure in Florida.

The phrase "crush resistant" when used with respect to a coating composition means that if the coating composition is applied to and dried or otherwise hardened on two face-to-face embossed fiber cement board substrates, and subjected to a pressure of about 6 kg/cm2, the coating will exhibit a rating of 3 or better when visually assessed using the 1 to 5 rating scale described below.

The phrase "final topcoat" refers to a coating composition which when dried or otherwise hardened provides a decorative or protective outermost finish layer on a fiber cement board attached to a building exterior. By way of further explanation, such final topcoats include paints, stains or sealers capable of withstanding extended outdoor exposure (e.g., exposure equivalent to one year of vertical south-facing Florida sunlight) without visually objectionable deterioration, but do not include primers that would not withstand extended outdoor exposure if left uncoated with a topcoat.

The term "functionalized" when used with respect to a latex polymer means the polymer contains additional pendant reactive chemical moieties other than carboxylic acid groups and linear, branched or ring structures containing $(CH_x)$ groups where x is 0, 1, 2, or 3.

The term "gloss" when used with respect to a coating composition means the 60° measurement obtained when evaluating a smooth region of a fiber cement board major surface according to ASTM D 523.

The term "loaded" when used with respect to a pallet means that the pallet contains a stack of four or more boards.

The phrase "low levels" when used with respect to a multistage latex polymer containing or made from styrene means that less than 30 wt. % styrene (based upon the total weight of ethylenically unsaturated monomers employed) is present in or was used to form the multistage latex polymer; "very low levels" means that less than 20 wt. % styrene is present in or was used to form the multistage latex polymer, and "substantially free of" means that less than 10 wt. % styrene is present in or was used to form the multistage latex polymer.

The phrase "low VOC" when used with respect to a liquid coating composition means that the coating composition contains less than about 10 wt. % volatile organic compounds, more preferably less than about 7% volatile organic compounds, and most preferably less than about 4% volatile organic compounds based upon the total liquid coating composition weight.

The term "(meth)acrylic acid" includes either or both of acrylic acid and methacrylic acid, and the term "(meth)acrylate" includes either or both of an acrylate and a methacrylate.

The term "multistage" when used with respect to a latex means the latex polymer was made using discrete charges of two or more monomers or was made using a continuously-varied charge of two or more monomers. Usually a multistage latex will not exhibit a single Tg inflection point as measured using DSC. For example, a DSC curve for a multistage latex made using discrete charges of two or more monomers may exhibit two or more Tg inflection points, Also, a DSC curve for a multistage latex made using a continuously-varied charge of two or more monomers may exhibit no Tg inflection points. By way of further explanation, a DSC curve for a single stage latex made using a single monomer charge or a non-varying charge of two monomers may exhibit only a single Tg inflection point. Occasionally when only one Tg inflection point is observed it may be difficult to determine whether the latex represents a multistage latex. In such cases a lower Tg inflection point may sometimes be detected on closer inspection, or the synthetic scheme used to make the latex may be examined to determine whether or not a multistage latex would be expected to be produced.

The term "pallet" refers to a portable warehousing platform upon which boards can be stacked and which can be moved within a warehouse using a forklift.

The phrase "flake resistant" when used with respect to a coating composition means that if the coating composition is applied to and dried or otherwise hardened on a fiber cement board substrate, the coating composition will maintain a flake rating not less than 5 (viz., a rating of 5 to 10), more preferably not less than 6 (viz., a rating of 6 to 10) and most preferably not less than 8 (viz., a rating of 8 to 10) when evaluated according to ASTM 772 using a 5 year vertical exterior exposure in Florida.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "pressure" when used with respect to a stack of pallets refers to the estimated or measured maximum pressure on a discernible region (e.g., an embossing peak) for the uppermost board on the lowermost pallet in the stack. This uppermost or top board tends to receive a very concentrated load in the regions directly beneath the pallet (e.g., under a pallet plank). Although boards beneath this top board may bear even greater total weight, such weight tends to be relatively evenly distributed with lower peak area loads than is the case directly beneath a pallet.

The term "unattached" when used with respect to a board means that the board has not been fastened (e.g., nailed, screwed or glued) to a building.

The phase "weather resistant" when used with respect to a coating composition means that the coating composition is at least one or more of (and more preferably at least two or more of, yet more preferably at least three or more of and most preferably all of) chalk resistant, color change resistant, crack resistant or flake resistant when exposed outdoors.

Figure 1:
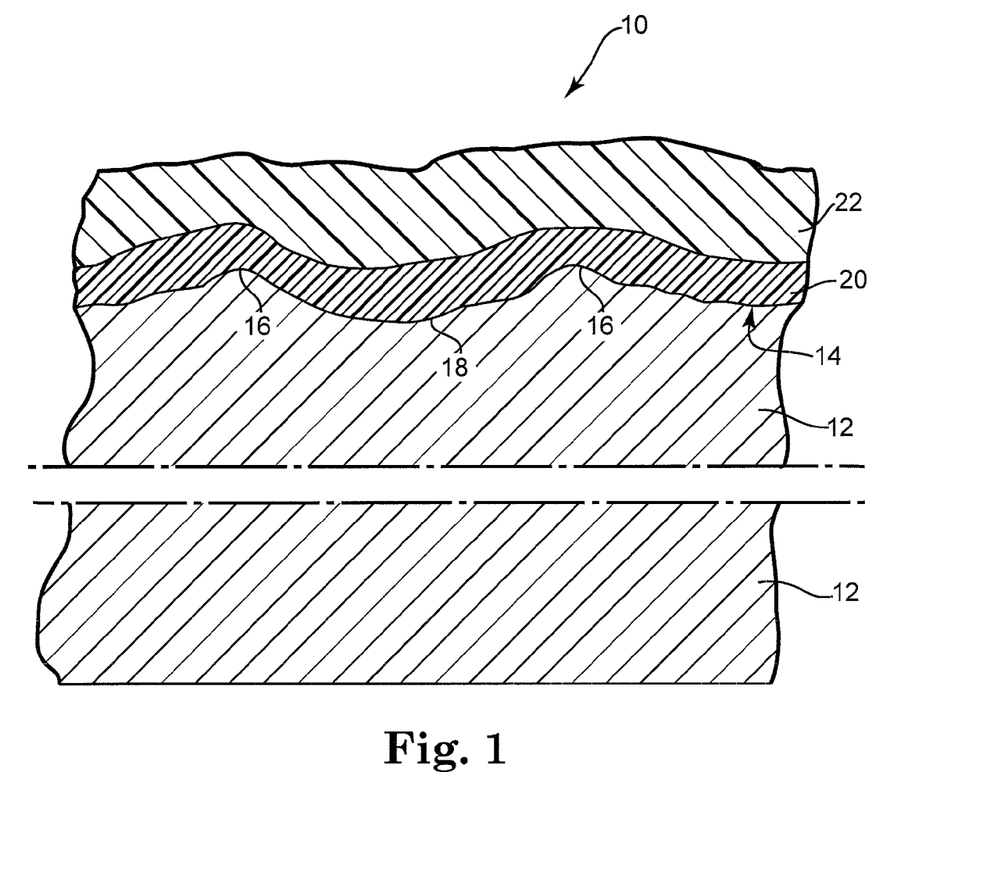
FIG. 1 is a schematic cross-sectional view of a coated fiber cement article.

Referring to FIG. 1, a coated fiber cement board 10 of the present invention is shown in schematic cross-sectional view. Board 10 includes a fiber cement substrate 12. Substrate 12 typically is quite heavy and may for example have a density of about 1 to about 1.6 g/cm$^3$ of more. The first major surface 14 of substrate 12 may be embossed with small peaks of ridges 16 and valleys 18, e.g., so as to resemble roughsawn wood. Major surface 14 may have a variety of other surface configurations, and may resemble a variety of building materials other than roughsawn wood. An optional further layer or layers 20 (which may for example be a sealer, primer or layers of both sealer and primer) may lie atop surface 14. Layer 20 can provide a firmly-adhered base layer upon which one or more firmly-adhered layers of final topcoat 22 may be formed, and may hide mottling or other irregularities (arising in some instances when the board is dried at the factory) which may otherwise be visible on surface 14. If a primer, layer 20 may include a high Pigment Volume Concentration (PVC), e.g., about 45% or more. Layer 20 is however not weather-resistant or decorative and is not designed or intended to serve as a final topcoat. Final topcoat 22 provides a crush resistant surface that is weather-resistant and decorative and which resists damage when additional boards are stacked atop article 10. Final topcoat 22 desirably withstands the forces that may be imparted to board 10 during other warehousing and shipping operations such as long-term storage and transporting of prefinished stacked boards 10 to a jobsite. Final topcoat 22 thus may provide reduced visual coating damage and, consequently, less need for touch-up repairs or recoating after board 10 has been attached to a building.

The differences in height between peaks 16 and valleys 18 in major surface 14 typically are much greater than those shown in FIG. 1; the thicknesses of primer layer 20 and final topcoat 22 have been magnified in FIG. 1 for emphasis. The typical actual differences in height between peaks 16 and valleys 18 in major surface 14 may for example be about 1 to about 5 mm.

Figure 2:
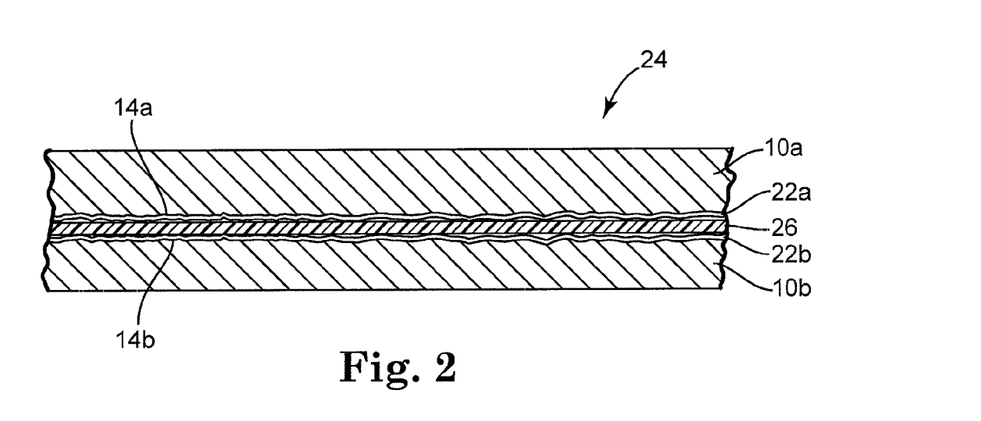
FIG. 2 is a schematic cross-sectional view of a face-to-face pair of coated fiber cement articles with a protective liner therebetween.

FIG. 2 shows a schematic cross-sectional view of a face-to-face pair 24 of coated fiber cement boards 10a, 10b whose embossed faces 14a, 14b may be covered with optional primer, optional sealer or both primer and sealer (not shown in FIG. 2) and final topcoats 22a, 22b. Final topcoats 22a, 22b face one another but are separated and protected somewhat from damage by protective liner 26 located between final topcoats 22a, 22b. The arrangement shown in FIG. 2 can provide better crush resistance when tall stacks of boards 10 are piled atop one another.

Figure 3:
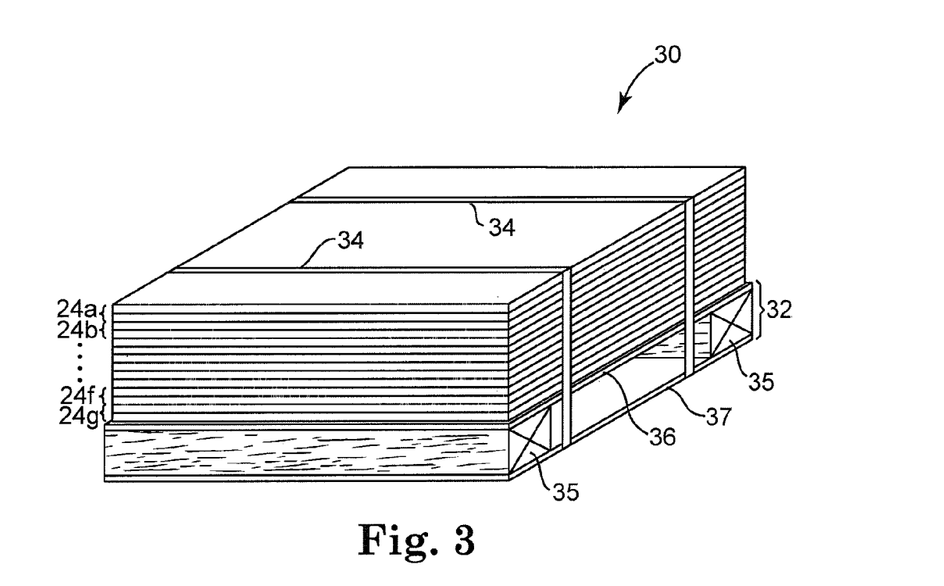
FIG. 3 is a perspective view of a pallet of coated fiber cement articles.

FIG. 3 shows a perspective view of a loaded pallet 30 including a pallet 32 upon which has been loaded a plurality of eight board pairs 24a through 24h. Optional strapping tape 34 helps stabilize loaded pallet 32. Cross beams 35 sandwiched between upper horizontal platform 36 and lower horizontal platform 37 also stabilize loaded pallet 32. Persons having ordinary skill in the art will recognize that other pallet configurations may be employed. For example, the pallet may include more cross-beams 35 (e.g., three, four, five or more) or may omit lower horizontal platform 37. Persons having ordinary skill in the art will recognize that pallet 32 may be loaded with fiber cement boards having shapes other than the large siding boards shown in FIG. 3. For example, a pallet may be loaded with rows of side-by-side planks, soffit panels, trim boards, shingles, stone replicas, stucco replicas and other available board configurations. Persons having ordinary skill in the art will also recognize that the height of a loaded pallet 32 may vary, and for example may be about 0.2 to about 2 meters.

Figure 4:
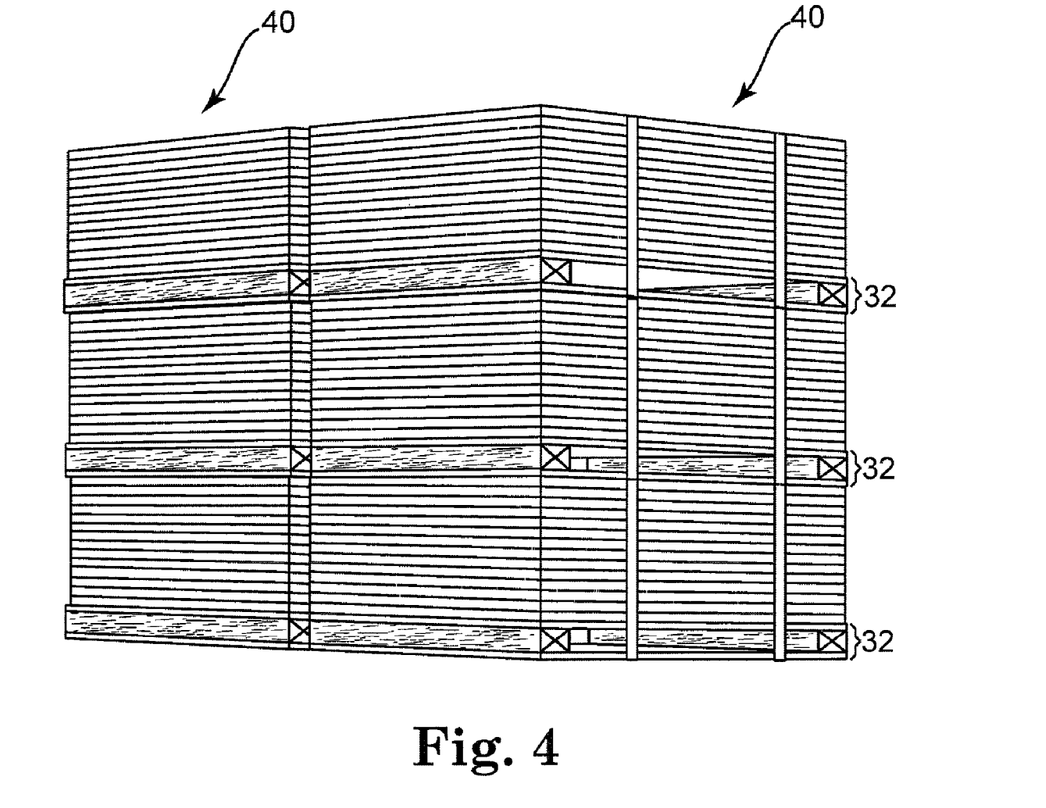
FIG. 4 is a perspective view of a multiple pallet stack of coated fiber cement articles.

FIG. 4 shows a perspective view of a two side-by-side stacks 40 each of which contains three loaded pallets 32 placed atop one another. Although FIG. 4 shows three pallets in each stack, the stacks may contain more or fewer pallets and may have a variety of overall heights. The pallet may not evenly distribute the weight, and the pallet cross beams may concentrate the pallet weight on peak regions within the embossed surface of boards beneath the pallet. Thus in practice all the overlying board weight may be exerted onto as little as 5-10% of the total board surface area. For example, using currently-available palletizing systems designed for fiber cement siding, coated fiber cement boards may be stacked up to about 6 meters high. For such a 6 meter stack, the resulting pressure (based on about 5-10% contact area) upon the uppermost board in the lowermost pallet of the stack may for example be about 10 kg/cm$^2$, and may be about 8 kg/cm$^2$ when the stack is 4 meters high and about 6 kg/cm$^2$ when the stack is 2 meters high.

A variety of fiber cement board substrates may be employed in the present invention. Such substrates will usually include a composite of wood pulp (e.g., containing cellulosic fibers), silica and hydraulic cement (e.g., Portland cement). Representative fiber cement substrates for use in the present invention include uncoated fiber cement substrates, sealed but unprimed fiber cement substrates, preprimed and optionally sealed fiber cement substrates, and prepainted and optionally primed or sealed fiber cement substrates. Whether or not already coated as obtained, the substrate may optionally be further primed, stained or sealed as desired, then topcoated as described herein. A variety of suitable fiber cement substrates are commercially available. For example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fiber cement. Other suitable fiber cement siding substrates include AQUAPANEL™ cement board products from Knauf USG Systems GmbH & Co. KG of Iserlohn, Germany, CEMPLANK™, CEMPANEL™ and CEMTRIM™ cement board products from Cemplank of Mission Viejo, Calif.; WEATHERBOARDS™ cement board products from CertainTeed Corporation of Valley Forge, Pa.; MAXITILE™, MAXISHAKE™ AND MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

The disclosed coated boards include one or more layers of a final topcoat. For example, in one exemplary embodiment the board is coated with a sealer layer and one or more final topcoat composition layers. In another exemplary embodiment the board is coated with a primer layer and one or more final topcoat composition layers. In yet another exemplary embodiment, the board is coated with a sealer layer, a primer layer and one or more final topcoat composition layers. Preferably, the various layers are selected to provide a coating system that has good adhesion to the substrate and between adjacent layers of the system.

Representative optional sealer layers include acrylic latex materials. The sealer layer may for example provide one or more features such as improved adhesion, efflorescence blocking, water resistance or block resistance. Exemplary sealers include unpigmented or low pigment level latex solutions containing, for example, between about 5 and 20 wt. % solids. An example of a commercially available sealer is OLYMPIC™ FC sealer (available from PPG). Other sealers include those described in U.S. Provisional Application Nos. 60/764,044, 60/764,103, 60/764,131 and 60/764,242 (each of which was filed Jan. 31, 2006), 60/802,185 and 60/802,186 (both filed May 19, 2006), 60/810,739 (filed Jun. 2, 2006) and 60/819,505 (filed Jul. 7, 2006). The disclosure of each of these Provisional Applications is incorporated herein by reference. A recommended thickness for the sealer after it is dried or otherwise hardened is about 0.1 to about 0.3 mm.

Representative optional primer layers include acrylic latex or vinyl primers. The primer may include color pigments, if desired. Preferred primers have a measured 60° gloss value less than 15 gloss units, more preferably less than 10 gloss units, and most preferably less than 5 gloss units, and a PVC of at least 45%. Preferred primers also provide blocking resistance. A recommended thickness for the primer after it is dried or otherwise hardened is about 10 to 50 micrometers and more preferably about 15 to about 30 micrometers.

A variety of final topcoat compositions may be used in the present invention. The topcoat includes a multistage latex polymer, typically will include a carrier (e.g., water or one or more organic solvents), may include other ingredients such as color pigments if desired, and in some embodiments could be characterized as a paint. Preferably, the final topcoat is formulated so that it can be applied and hardened on cement substrates using factory application equipment that moves the board past a coating head and suitable drying or curing equipment. Preferred final topcoat compositions have a measured 60° gloss value greater than 1 gloss unit, and more preferably between 5 and 30 gloss units.

A variety of multistage latex polymers may be used in the disclosed final topcoats. The multistage latex preferably contains at least two polymers of different glass transition temperatures (viz., different Tg values). In one preferred embodiment, the latex may include a first polymer stage (the soft stage) having a Tg less than 40° C., e.g., between about −65 and 40° C. and more preferably between about −15 and 15° C., and a second polymer stage (the hard stage) having a Tg greater than 40° C., e.g., between about 40 and 230° C. and more preferably between about 60 and 105° C.

Multistage latexes are conveniently prepared using emulsion polymerization and sequential monomer feeding techniques. For example, a first monomer composition is fed during the early stages of the polymerization, and then a second different monomer composition is fed during later stages of the polymerization. In certain embodiments it may be favorable to start the polymerization with a high Tg monomer composition and then switch to a low Tg monomer composition, while in other embodiments, it may be favorable to start the polymerization with a low Tg monomer composition and then switch to a high Tg monomer composition. Numerous hard and soft stages may also be utilized. For example, in certain compositions it may be beneficial to polymerize two different low Tg soft stage monomer compositions. In an illustrative embodiment, the first soft stage may be prepared with a monomer composition Tg close to room temperature (e.g., 20° C.) and the second soft stage may be prepared with monomer composition Tg well below room temperature (e.g., less than 5° C.). While not intending to be bound by theory, it is believed that this second soft stage polymer assists in improving coalescence of the latex polymer particles.

It may be advantageous to use a gradient Tg latex polymer made using continuously varying monomer feeds. The resulting polymer will typically have a DSC curve that exhibits no Tg inflection points, and could be said to have an essentially infinite number of Tg stages. For example, one may start with a high Tg monomer feed and then at a certain point in the polymerization start to feed a low Tg soft stage monomer composition into the high Tg hard stage monomer feed. The resulting multistage latex polymer will have a gradient Tg from high to low. In other embodiments, it may be favorable to feed a high Tg hard stage monomer composition into a low Tg soft stage monomer composition. A gradient Tg polymer may also be used in conjunction with multiple Tg polymers. As an example, one may employ a high Tg monomer feed (F1) and a low Tg monomer feed (F2), with the F2 feed being directed into the F1 monomer vessel, and the feed from the F1 vessel being directed into the latex reactor vessel. Polymerization could begin with feed F2 being turned off and feed F1 being sent into the latex reactor vessel to initiate polymerization. After polymerization is underway, one could feed F2 into F1 at a faster F2 feed rate than the overall F1+F2 feed rate into the reactor vessel, and in this example provide reduced Tg "soft stage" polymer particles with a higher Tg core and a gradient Tg shell.

The disclosed multistage latex polymer compositions preferably include about 5 to about 95 weight percent soft stage polymer morphology based on total polymer weight, more preferably about 50 to about 90 weight percent soft stage polymer morphology based on total polymer weight, and most preferably about 60 to about 80 weight percent soft stage polymer morphology on total polymer weight. The disclosed multistage latex polymer compositions preferably include about 5 to 95 weight percent hard stage polymer morphology on total polymer weight, more preferably about 10 to about 50 weight percent hard stage polymer morphology on total polymer weight, and most preferably about 20 to about 40 weight percent hard stage polymer morphology on total polymer weight.

The disclosed final topcoat compositions preferably include at least about 10 wt. %, more preferably at least about 25 wt. %, and yet more preferably at least about 35 wt. % multistage latex polymer based on the total composition solids. The disclosed final topcoat compositions also preferably include less than 100 wt. %, more preferably less than about 85 wt. %, and yet more preferably less than about 80 wt. % multistage latex polymer, based on the total composition solids.

The multistage latex polymer is preferably prepared through chain-growth polymerization, using one or more ethylenically unsaturated monomers. The polymerization reaction may be performed at a variety of temperatures, e.g., a temperature in the range of about 10 to about 100° C. Examples of suitable ethylenically unsaturated monomers include acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide, acrylamide, methacrylamide, methylol (meth)acrylamide, styrene, a-methyl styrene, vinyl toluene, vinyl acetate, vinyl propionate, allyl methacrylate, and mixtures thereof.

A preferred multistage latex polymer embodiment may also be made using one or more hydrophobic monomers (e.g., tert-butyl (meth)acrylate, butyl methacrylate, cyclohexyl (meth)acrylate, 2-ethylhexyl (meth)acrylate, styrene, tert-butyl styrene and other monomers that will be familiar to persons having ordinary skill in the art of making latex polymers). For example, the multistage latex polymer could be made using at least 15 wt. % butyl methacrylate based upon total latex polymer solids.

Preferred multistage latex polymers may also contain low levels of styrene. More preferably, they may contain very low levels of styrene. Most preferably, they may be substantially free of styrene.

Another preferred embodiment may be made using a functionalized multistage latex polymer, such as a polymer incorporating acetoacetyl functionality. For example, acetoacetyl functionality may be incorporated into the polymer through the use of monomers such as acetoacetoxyethyl acrylate, acetoacetoxypropyl methacrylate, allyl acetoacetate, acetoacetoxybutyl methacrylate, 2,3-di(acetoacetoxy)propyl methacrylate, 2-(acetoacetoxy) ethyl methacrylate, t-butyl acetoacetate, diketene, and the like, or combinations thereof. In certain embodiments, the acetoacetyl functional latex polymer is preferably prepared through chain-growth polymerization, using, for example, 2-(acetoacetoxy)ethyl methacrylate (AAEM). Preferred functionalized latex polymers include at least about 0.5 wt. % functionality (e.g., acetoacetyl functionality), more preferably about 0.5 to about 5 wt. % functionality (e.g., acetoacetyl functionality), and most preferably about 1 to about 4 wt. % functionality (e.g., acetoacetyl functionality), based on the total weight of the latex polymer. Exemplary functionalized latex polymers are described in U.S. Published Patent Application Nos. US 2006/0135684 A1 and US 2006/0135686 A1, the disclosures of which are incorporated herein by reference. Polymerizable hydroxy-functional or other active hydrogen containing monomers may also be converted to the corresponding acetoacetyl functional monomer by reaction with diketene or other suitable acetoacetylating agent (see, e.g., Comparison of Methods for the Preparation of Acetoacetylated Coating Resins, Witzeman, J. S.; Dell Nottingham, W.; and Del Rector, F. J., Coatings Technology; Vol. 62, 1990, 101 and the references contained therein). In preferred coating compositions, the acetoacetyl functional group is incorporated into the polymer via 2-(acetoacetoxy) ethyl methacrylate, t-butyl acetoacetate, diketene, or combinations thereof.

The multistage latex polymer may also be prepared with a high Tg alkali-soluble polymer hard stage. Alkali-soluble polymers may be prepared by making a polymer with acrylic or methacrylic acid or other polymerizable acid monomer (usually at greater than 7 wt. %) and solubilizing the polymer by addition of ammonia or other base. Examples of suitable alkali-soluble high Tg support polymers include JONCRYL™ 675 and JONCRYL 678 oligomer resins, available from BASF. A low Tg soft stage monomer composition or gradient Tg composition could then be polymerized in the presence of the hard stage alkali-soluble polymer to prepare a multistage latex polymer.

The ratios of monomers in the disclosed multistage latex polymers may be adjusted to provide the desired level of "hard" or "soft" segments. The Fox equation may be employed to calculate the theoretical Tg of a polymer made from two monomer feeds:

$$1/Tg = W_a/T_{ga} + W_b/T_{gb}$$

where $T_{ga}$ and $T_{gb}$ are the respective glass transition temperatures of polymer's made from monomers "a" and "b"; and $W_a$ and $W_b$ are the respective weight fractions of polymers "a" and "b".

For example, a soft segment may be introduced by providing a monomer composition containing 5 to 65 parts butyl acrylate, 20 to 90 parts butyl methacrylate, 0 to 55 parts methyl methacrylate and 0.5 to 5 parts (meth)acrylic acid, and a hard segment may be introduced by providing a monomer composition comprising 0 to 20 parts butyl acrylate, 0 to 40 parts butyl methacrylate, 45 to 95 parts methyl methacrylate and 0.5 to 5 parts (meth)acrylic acid. A soft segment may also be introduced by providing a monomer composition containing 5 to 65 parts butyl acrylate, 20 to 90 parts butyl methacrylate, 0 to 55 parts methyl methacrylate, 0 to 5 parts (meth)acrylic acid and 0 to 20 parts 2-(acetoacetoxy)ethyl methacrylate (AAEM), and a hard segment may be introduced by providing a monomer composition containing 0 to 20 parts butyl acrylate, 0 to 40 parts butyl methacrylate, 45 to 95 parts methyl methacrylate, 0 to 5 parts (meth)acrylic acid and 0 to 20 parts AAEM. The aforementioned compositions are illustrative of this concept and other compositions can be used in the practice of this invention.

The latex polymers are typically stabilized by one or more nonionic or anionic emulsifiers, used either alone or together. Emulsifiers suitable for use in the final topcoat composition will be known to persons having ordinary skill in the art or can be determined using standard methods. Examples of suitable nonionic emulsifiers include tert-octylphenoxyethylpoly (39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly (20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene (20)lauramide, N-lauryl-N-polyoxyethylene(3)amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium, potassium, lithium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$-$C_{16}$) sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate.

One or more water-soluble free radical initiators typically are used in the chain growth polymerization of the multistage latex polymer. Initiators suitable for use in the final topcoat composition will be known to persons having ordinary skill in the art or can be determined using standard methods. Representative water-soluble free radical initiators include hydrogen peroxide; tert-butyl peroxide; alkali metal persulfates such as sodium, potassium and lithium persulfate; ammonium persulfate; and mixtures of such initiators with a reducing agent. Representative reducing agents include sulfites, such as alkali metal metabisulfite, hydrosulfite, and hyposulfite; sodium formaldehyde sulfoxylate; and reducing sugars such as ascorbic acid and isoascorbic acid. The amount of initiator is preferably from about 0.01 to about 3 wt. %, based on the total amount of monomer. In a redox system the amount of reducing agent is preferably from 0.01 to 3 wt. %, based on the total amount of monomer.

A variety of commercially-available multistage latex polymers may be used to prepare the disclosed final topcoat compositions. Representative such polymers are believed to include NEOCRYL™ XK-90, NEOCRYL™ XK-98, and NEOCRYL™ XK-230 multistage latex acrylic polymer emulsions (available from DSM NeoResins Inc. of Wilmington, Mass. and mixtures thereof.

The disclosed final topcoat compositions may contain one or more optional VOCs. VOCs suitable for use in the final topcoat composition will be known to persons having ordinary skill in the art or can be determined using standard methods. Desirably the final topcoat compositions are low VOC, and preferably include less than 10 wt. %, more preferably less than 7 wt. %, and most preferably less than 4 wt. % VOCs based upon the total composition weight.

The disclosed final topcoat compositions may contain one or more optional coalescents to facilitate film formation. Coalescents suitable for use in the final topcoat composition will be known to persons having ordinary skill in the art or can be determined using standard methods. Suitable coalescents include glycol ethers such as EASTMAN™ EP, EASTMAN DM, EASTMAN DE, EASTMAN DP, EASTMAN DB and EASTMAN PM from Eastman Chemical Co. and ester alcohols such as TEXANOL™ ester alcohol from Eastman Chemical Co. Preferably, the optional coalescent is a low VOC coalescent such as is described in U.S. Pat. No. 6,762,230 B2, the disclosure of which is incorporated herein by reference. The final topcoat compositions preferably include a low VOC coalescent in an amount of at least about 0.5 wt. %, more preferably at least about 1 wt. %, and yet more preferably at least about 1.5 wt. %. The final topcoat compositions also preferably include a low VOC coalescent in an amount of less than about 10 wt. %, more preferably less than about 6 wt. %, and yet more preferably less than about 4 wt. %, based on the weight of the latex polymer.

The disclosed final topcoat compositions may contain one or more optional surface-active agents that modify the interaction of the topcoat composition with the substrate or with a prior applied coating. The surface-active agent affects qualities of the composition including how the composition is handled, how it spreads across the surface of the substrate, and how it bonds to the substrate. In particular, the agent can modify the ability of the composition to wet a substrate. Surface-active agents may also provide leveling, defoaming or flow control properties, and the like. Surface-active agents suitable for use in the final topcoat composition will be known to persons having ordinary skill in the art or can be determined using standard methods. If used, the surface-active agent is preferably present in an amount of less than 5 wt. %, based on the total weight of the topcoat composition Surface-active agents suitable for use in the final topcoat composition will be known to persons having ordinary skill in the art or can be determined using standard methods. Exemplary surface-active dispersing or wetting agents include those available under the trade designations STRODE™ KK-95H, STRODEX PLF100, STRODEX PK0VOC, STRODEX LFK70, STRODEX SEK50D and DEXTROL™ OC50 from Dexter Chemical L.L.C. of Bronx, N.Y.; HYDROPALAT™ 100, HYDROPALAT 140, HYDROPALAT 44, HYDROPALAT 5040 and HYDROPALAT 3204 from Cognis Corp. of Cincinnati, Ohio; LIPOLIN™ A, DISPERS™ 660C, DISPERS 715W and DISPERS 750W from Degussa Corp. of Parsippany, N.J.; BYK™ 156, BYK 2001 and ANTI-TERRA™ 207 from Byk Chemie of Wallingford, Conn.; DISPEX™ A40, DISPEX N40, DISPEX R50, DISPEX G40, DISPEX GA40, EFKA™ 1500, EFKA 1501, EFKA 1502, EFKA 1503, EFKA 3034, EFKA 3522, EFKA 3580, EFKA 3772, EFKA 4500, EFKA 4510, EFKA 4520, EFKA 4530, EFKA 4540, EFKA 4550, EFKA 4560, EFKA 4570, EFKA 6220, EFKA 6225, EFKA 6230 and EFKA 6525 from Ciba Specialty Chemicals of Tarrytown, N.Y.; SURFYNOL™ CT-111, SURFYNOL CT-121, SURFYNOL CT-131, SURFYNOL CT-211, SURFYNOL CT 231, SURFYNOL CT-136, SURFYNOL CT-151, SURFYNOL CT-171, SURFYNOL CT-234, CARBOWET™ DC-01, SYRFYNOL 104, SURFYNOL PSA-336, SURFYNOL 420, SURFYNOL 440, ENVIROGEM™ AD-01 and ENVIROGEM AE01 from Air Products & Chemicals, Inc. of Allentown, Pa.; TAMOL™ 1124, TAMOL 850, TAMOL 681, TAMOL 731 and TAMOL SG-1 from Rohm and Haas Co. of Philadelphia, Pa.; IGEPAL™ CO-210, IGEPAL CO-430, IGEPAL CO-630, IGEPAL CO-730, and IGEPAL CO-890 from Rhodia Inc. of Cranbury, N.J.; T-DET™ and T-MULZ™ products from Harcros Chemicals Inc, of Kansas City, Kans.; polydimethylsiloxane surface active agents (such as those available under the trade designations SILWET™ L-760 and SILWET L-7622 from OSI Specialties, South Charleston, W. Va., or BYK 306 from Byk-Chemie) and fluorinated surface-active agents (such as that commercially available as FLUORAD FC-430 from 3M Co., St. Paul, Minn.). The surface-active agent may include a defoamer. Exemplary defoamer's include BYK 018, BYK 019, BYK 020, BYK 022, BYK 025, BYK 032, BYK 033, BYK 034, BYK 038, BYK 040, BYK 060, BYK 070 and BYK 077 from Byk Chemie; SURFYNOL DF-695, SURFYNOL DF-75, SURFYNOL DF-62, SURFYNOL DF-40 and SURFYNOL DF-110D from Air Products & Chemicals, Inc.; DEEFO™ 3010A, DEEFO 2020E/50, DEEFO 215, DEEFO 806-102 and AGITAN™ 31BP from Munzing Chemie GmbH of Heilbronn, Germany; EFKA 2526, EFKA 2527 and EFKA 2550 from Ciba Specialty Chemicals; FOAMAX™ 8050, FOAMAX 1488, FOAMAX 7447, FOAMAX 800, FOAMAX 1495 and FOAMAX 810 from Degussa Corp.; FOAMASTER™ 714, FOAMASTER A410, FOAMASTER 111, FOAMASTER 333, FOAMASTER 306, FOAMASTER SA-3, FOAMASTER AP, DEHYDRAN™ 1620, DEHYDRAN 1923 and DEHYDRAN 671 from Cognis Corp.

The disclosed final topcoat compositions may contain one or more optional pigments, Pigments suitable for use in the final topcoat composition will be known to persons having ordinary skill in the art or can be determined using standard methods. Exemplary pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toluidine red), quinacridone magenta, quinacridone violet, DNA orange, or organic yellows (such as Hansa yellow). The final topcoat composition may also include a gloss control agent or an optical brightener agent, such as UVITEX™ OB optical brightener, available from Ciba Specialty Chemicals of Tarrytown, N.Y.

In certain embodiments it is advantageous to include fillers or inert ingredients in the topcoat composition. Fillers or inert ingredients extend, lower the cost of, alter the appearance of, or provide desirable characteristics to the composition before and after curing. Fillers and inert ingredients suitable for use in the final topcoat composition will be known to persons having ordinary skill in the art or can be determined using standard methods. Exemplary fillers or inert ingredients include clay, glass beads, calcium carbonate, talc, silicas, feldspar, mica, barytes, ceramic microspheres, calcium metasilicates, organic fillers and the like. Fillers or inert ingredients are preferably present in an amount of less than about 15 wt. %, based on the total weight of the topcoat composition.

In certain applications it may also be desirable to include biocides or fungicides. Exemplary biocides or fungicides include ROZONE™ 2000, BUSAN™ 1292 and BUSAN 1440 from Buckman Laboratories of Memphis, Tenn.; POLYPHASE™ 663 and POLYPHASE 678 from Troy Chemical Corp. of Florham Park, N.J. and KATHON™ LX from Rohm and Haas Co.

The final topcoat may also include other optional ingredients that modify properties of the topcoat composition as it is stored, handled, or applied, or at other or subsequent stages. Waxes, flatting agents, rheology control agents, mar and abrasion additives, and other similar performance-enhancing additives may be employed as needed in amounts effective to upgrade the performance of the final topcoat composition and the dried or otherwise hardened topcoat. Exemplary wax emulsions to improve coating physical performance include MICHEM™ Emulsions 32535, 21030, 61335, 80939M and 7173MOD from Michelman, Inc. of Cincinnati, Ohio and CHEMCOR™ 20N35, 43A40, 950C25 and 10N30 from ChemCor of Chester, N.Y., Exemplary rheology control agents include RHEOVIS™ 112, RHEOVIS 132, RHEOVIS152, VISCALEX™ HV30, VISCALEX AT88, EFKA 6220 and EFKA 6225 from Ciba Specialty Chemicals; BYK 420 and BYK 425 from Byk Chemie; RHEOLATE™ 205, RHEOLATE 420 and RHEOLATE 1 from Elementis Specialties of Hightstown, N.J.; ACRYSOL™ L TT-615, ACRYSOL RM-5, ACRYSOL RM-6, ACRYSOL RM-8W, ACRYSOL RM-2020 and ACRYSOL RM-825 from Rohm and Haas Co.; NATROSOL™ 250LR from Hercules Inc. of Wilmington, Del. and CELLOSIZE™ QP09L from Dow Chemical Co. of Midland, Mich. Desirable performance characteristics of the coating include chemical resistance, abrasion resistance, hardness, gloss, reflectivity, appearance, or combinations of these characteristics, and other similar characteristics. For example, the topcoat may contain abrasion resistance promoting adjuvants such as silica or aluminum oxide (e.g., sol-gel processed aluminum oxide).

A variety of other optional additives may be used in the disclosed final topcoat compositions and will be familiar to persons having ordinary skill in the art, including those described in Koleske et al., *Paint and Coatings Industry*, April 2003, pages 12-86. For example, the final topcoat compositions may include one or more performance or property enhancing additives such as colorants, dyes, thickeners, heat stabilizers, leveling agents, anti-cratering agents, curing indicators, plasticizers, sedimentation inhibitors, ultraviolet-light absorbers, and the like. Also, for application using factory coating equipment (e.g., curtain coaters), the composition may employ additives tailored to the chosen equipment and installation. Such additives typically are selected on a site-by-site basis using standard methods that will be familiar to persons having ordinary skill in the art.

The final topcoat composition may be applied to the optionally sealed or primed substrate using any suitable application method. For example, the topcoat composition may be roll coated, sprayed, curtain coated, vacuum coated, brushed, or flood coated using an air knife system. Preferred application methods provide a uniform coating thickness and are cost efficient, Especially preferred application methods employ factory equipment that moves the board past a coating head and thence past suitable drying or curing equipment. The coating covers at least a portion of the first major surface of the board, and desirably covers the entire first major surface, in a substantially uniformly thick layer.

The disclosed final topcoat compositions preferably have a PVC less than 45%, more preferably less than about 40%, and most preferably about 10 to about 35%. The final topcoat compositions also preferably have an MFFT of about 0 to about 55° C., and more preferably about 0 to about 20° C., when tested with a RHOPOINT™ 1212/42 MFFT-60 bar instrument, available from Rhopoint Instruments Ltd. of East Sussex, United Kingdom.

It has been found that the thickness of the topcoat layer can affect the performance of the present invention. For example, if the topcoat is too thin the finished board may not achieve the desired performance, weatherability and appearance. If the topcoat is too thick the costs of the system will unnecessarily increase. A recommended thickness for the dried or otherwise hardened final topcoat is between about 20 and about 200 micrometers, preferably between about 25 and about 120 micrometers, more preferably between about 30 and about 100 micrometers, and most preferably between about 35 and about 75 micrometers.

The topcoat may be hardened into a paint film using any suitable process (e.g., two-part curing mechanism, radiation curing, air drying, heat curing, etc.). More preferably, the topcoat is hardened without the need to heat the cement substrate to a high temperature. Although the use of such a heating process is within the scope of the present invention, it is somewhat less efficient for cement-based products given their low heat transfer characteristics. Consequently, preferred processes generally employ board surface temperatures of less than 100° C., more preferably less than 90° C., and most preferably less than 80° C. Radiation hardened systems (e.g., UV or visible-light cured systems) or multi-component systems (e.g., two-part systems) may be utilized. Multi-component systems may be hardened, for example, by mixing the components prior to or during application to the substrate and allowing the mixed components to harden on the substrate. Other low temperature hardened systems will be known to persons having ordinary skill in the art or can be determined using standard methods, and may be utilized if desired.

The disclosed prefinished boards may be stacked using one of more liners between adjacent boards. Exemplary liners include sheet and film materials that can help protect the boards from damage. The liners may, if desired, adhere lightly to the board face (thereby helping keep the liner against the board surface) or simply remain in place by friction. In a preferred embodiment, board pairs are stacked in face-to-face relationship with a liner disposed between the faces to form a crush-resistant unit. A plurality of these units may then be stacked to form a larger stack. Exemplary liners include paper, plastic, foam, non-woven or fabric sheets and film materials. Preferred liners include plastic sheets to protect the finished board from rubbing and scraping damage during transport and installation. The liner may have a variety of thickness, e.g., between about 20 and about 100 micrometers.

The disclosed final topcoats resist crush damage. Crush resistance may be visually assessed and rated using a 1 to 5 rating scale, as described below, with 5 being essentially no damage and 1 being severe damage of the coating. The final topcoat provides crush resistance of at least 3, more preferably at least 4 and most preferably 5 when two face-to-face coated embossed substrates are subjected to a pressure of about 6 kg/cm$^2$, more preferably about 8 kg/cm$^2$, and most preferably about 10 kg/cm$^2$. For example, the test board samples preferably achieve a rating of 3 or greater, more preferably 4 or greater, and optimally 5, when tested at a pressure of about 8 kg/cm$^2$. The Crush Resistance visual assessment may be carried out as follows:

SUBSTRATE PREPARATION

A 15 cm×21 cm factory primed wood grain embossed fiber cement siding board (HARDIEPLANK lap siding, SELECT CEDARMILL grade, available from James Hardie Building Products, Inc.) is preheated to 46-54° C. in a high velocity hot air oven with a 149° C. airstream for 60 seconds, then coated with the final topcoat composition using a paint brush and enough material to provide a dry film thickness (DFT) of about 28 micrometers. Immediately after applying the first coat, the coated board is placed in the oven for 20 seconds to bring the board surface temperature (BST) to 43-52° C. After a 10 second flash-off time, the board is recoated with the final topcoat using the paint brush and enough material to provide about 28 micrometer DFT and total about 56 micrometer DFT. The coated board is then returned to the oven and force dried for 60 seconds to a 70 to 90° C. BST. The coated board is removed from the oven and cooled to about 49° C. BST, covered with a 0.0038 to 0.0064 mm thick sheet of INTEGRAL™ 816 polyolefin protective liner (available from Dow Chemical Company of Midland, Mich.). A second, similarly coated and liner-covered board with about a 49° C. BST is placed face-to-face with the test board. Both boards (with the two protective sheets between them) are placed in a hydraulic press whose platens have been heated to about 49° C. and subjected to a test pressure (e.g., 6, 8 or 10 kg/cm$^2$, corresponding to 85, 114 or 142 p.s.i.) for 5 minutes. The boards are removed from the press, and those portions of the test board embossed with a tight wood grain pattern are evaluated according to the rating scale shown below in Table 1. An average rating for three test samples is recorded.

TABLE 1

Visual Assessment

| Rating value | Appearance of the panel |
|---|---|
| 1 | Obviously crushed: Peaks are severely crushed and the grain pattern from the opposing board is embossed into the coating, causing severe wrinkling of the coating around the damaged area. |
| 2 | Moderately crushed: Peaks show flattening to widths over 4 mm, and the grain pattern from the opposing board is slightly embossed into the coating |
| 3 | Slightly crushed: Many peaks show flattening to a width of 2 mm to 4 mm. |
| 4 | Very slightly crushed: A few peaks show peak flattening to a width less than 2 mm. |
| 5 | Uncrushed: no crushed peaks or glossy spots are visible to the unaided eye or with 5X magnification. |

As shown in the following Examples, fiber cement products having a final topcoat system of the present invention provide significant crush resistance compared to fiber cement products that do not incorporate the improved topcoat system.

EXAMPLE 1

Multistage Latex Polymer A

Figure 5:
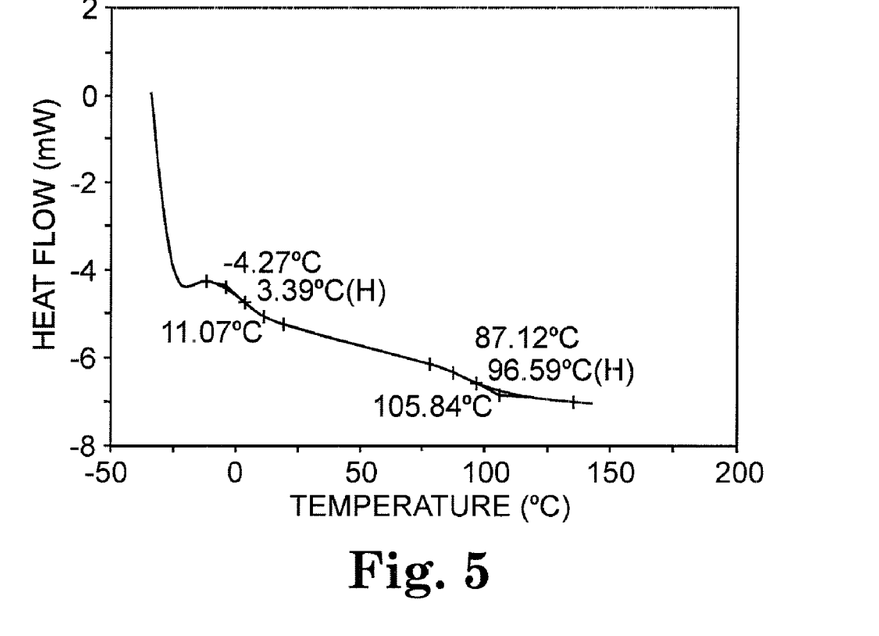
FIG. 5 through FIG. 11 are differential scanning calorimetry (DSC) curves showing Tg values for various latex polymers.

NEOCRYL™ XK-90 multistage latex acrylic polymer emulsion (available from DSM NeoResins Inc. of Wilmington, Mass. was subjected to DSC analysis using a Q SERIES™ DSC thermal analysis instrument from TA Instruments of New Castle, Del. FIG. 5 shows the DSC curve, and demonstrates that the polymer exhibited two distinct Tg values, namely a soft stage Tg at about 3.4° C. and a hard stage Tg at about 96.6° C.

EXAMPLE 2

Multistage Latex Polymer B

Figure 6:
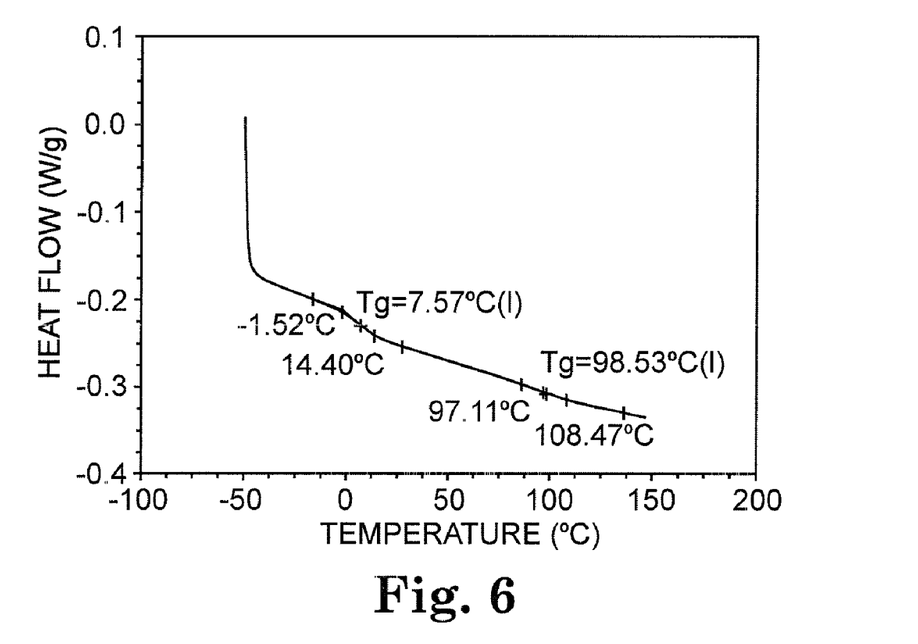

An acetoacetyl functional multistage latex polymer was prepared from a first monomer mixture containing butyl acrylate, butyl methacrylate, and methacrylic acid and a second monomer mixture containing methyl methaerylate, butyl methacrylate and methacrylic acid. FIG. 6 shows the DSC curve, and demonstrates that the polymer exhibited two distinct Tg values, namely a soft stage Tg at about 7.6° C. and a hard stage Tg at about 98.5° C.

EXAMPLE 3

Multistage Latex Polymer C

Figure 7:
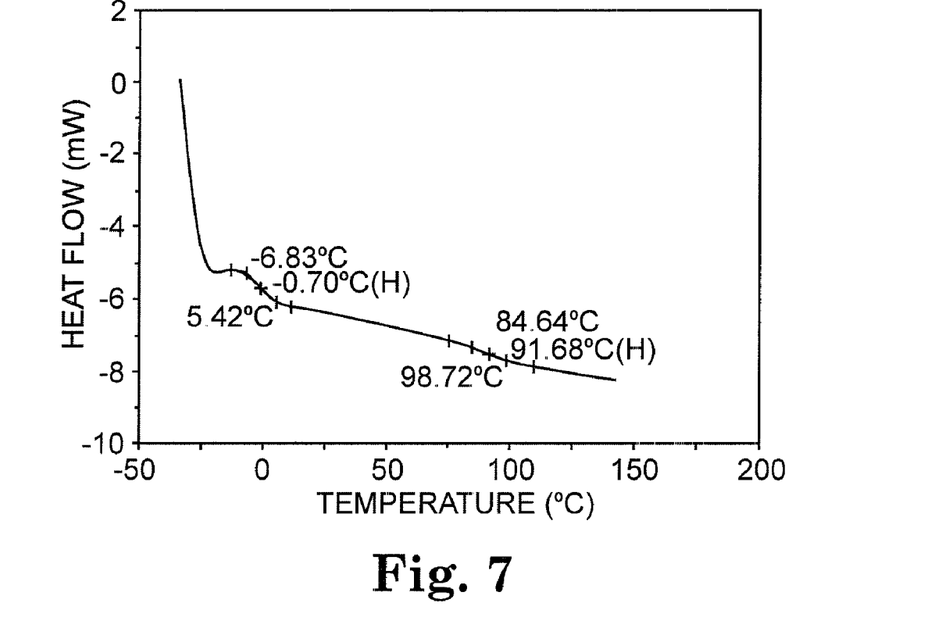

A multistage latex polymer was prepared from a first monomer mixture containing butyl acrylate, butyl methacrylate, acrylic acid and methacrylic acid and a second monomer mixture containing butyl acrylate, methyl methacrylate and methacrylic acid. FIG. 7 shows the DSC curve, and demonstrates that the polymer exhibited two distinct Tg values, namely a soft stage Tg at about 0.7° C. and a hard stage Tg at about 91.7° C.

EXAMPLE 4

Multistage Latex Polymer D

Figure 8:
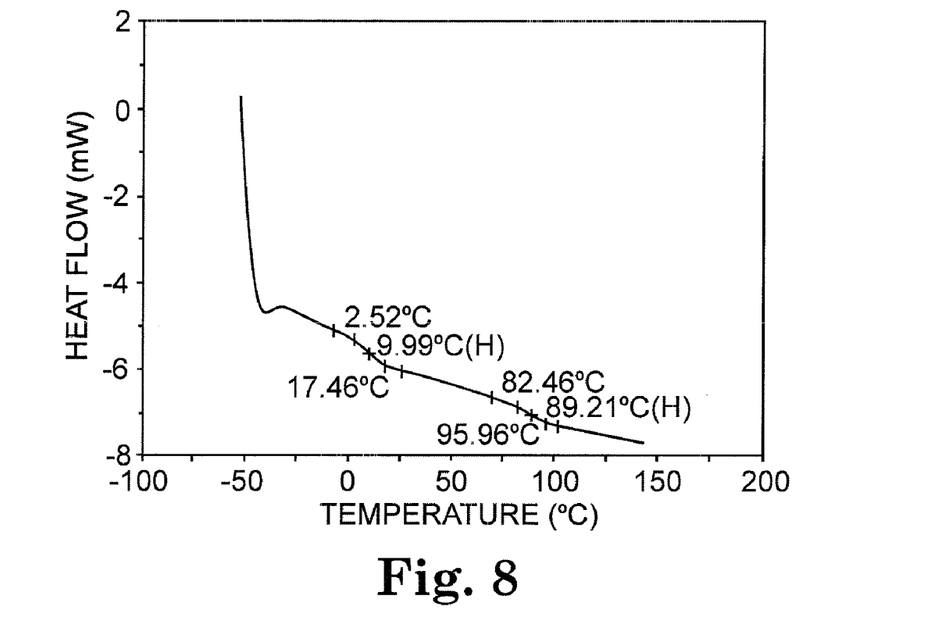

An acetoacetyl functional multistage latex polymer was prepared from a first monomer mixture containing 2-ethylhexyl acrylate, butyl methacrylate, AAEM and methacrylic acid and a second monomer mixture containing methyl methacrylate, butyl methacrylate, AAEM and methacrylic acid. FIG. 8 shows the DSC curve, and demonstrates that the polymer exhibited two distinct Tg values, namely a soft stage Tg at about 10° C. and a hard stage Tg at about 89.2° C.

COMPARISON EXAMPLE 5

Single Stage Latex Polymer E

Figure 9:
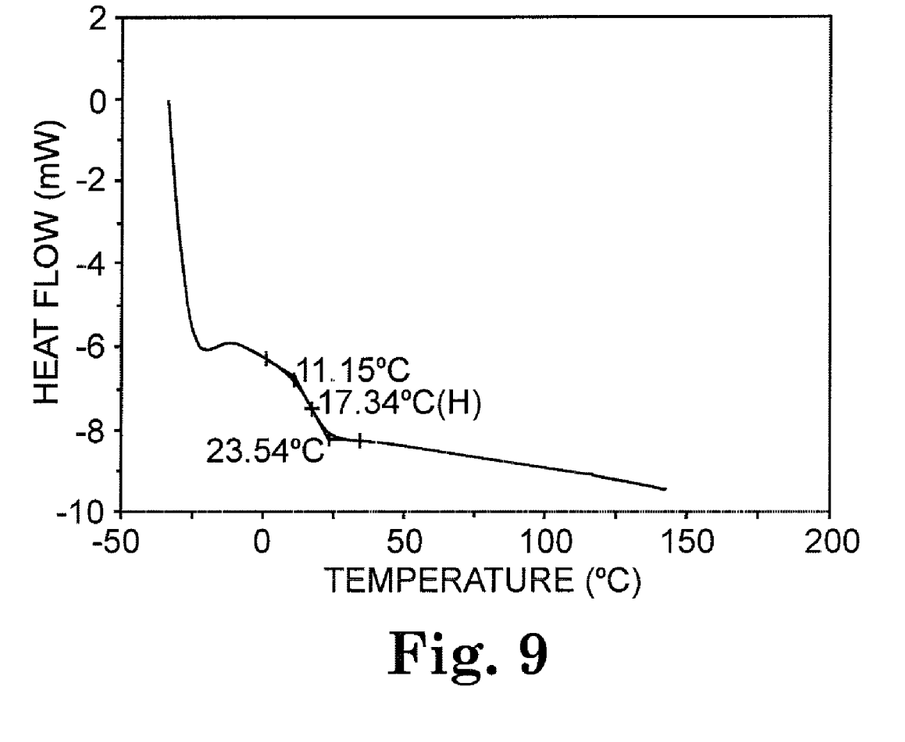

ACRONOL OPTIVE™ 220 aqueous acrylic ester copolymer dispersion (available from BASF Corporation of Florham Park, N.J.) was subjected to DSC analysis. FIG. 9 shows the DSC curve, and demonstrates that the polymer exhibited a single Tg at about 17.3° C.

COMPARISON EXAMPLE 6

Single Stage Latex Polymer F

Figure 10:
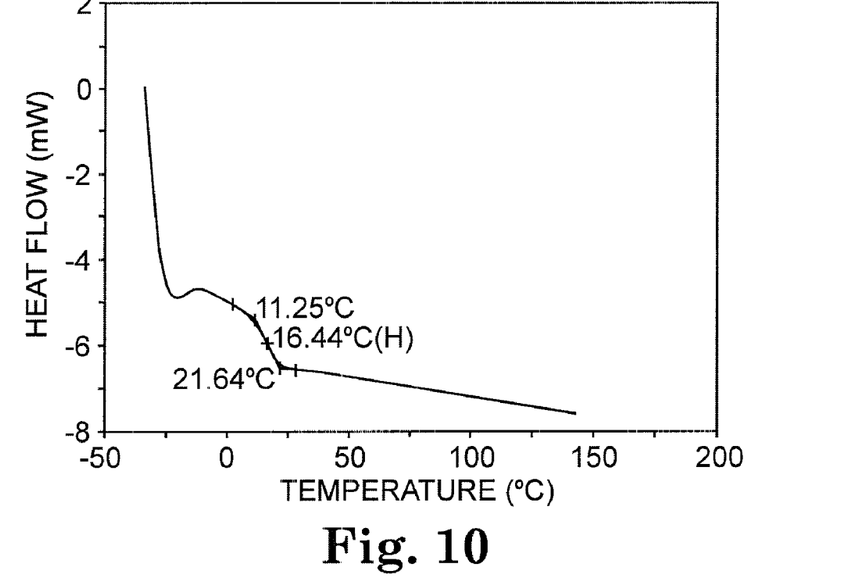

RHOPLEX™ AC-2829 acrylic polymer, emulsion (available from Rohm and Haas Company of Philadelphia, Pa.) was subjected to DSC analysis. FIG. 10 shows the DSC curve, and demonstrates that the polymer exhibited a single Tg at about 16.4° C.

COMPARISON EXAMPLE 7

Single Stage Latex Polymer G

Figure 11:
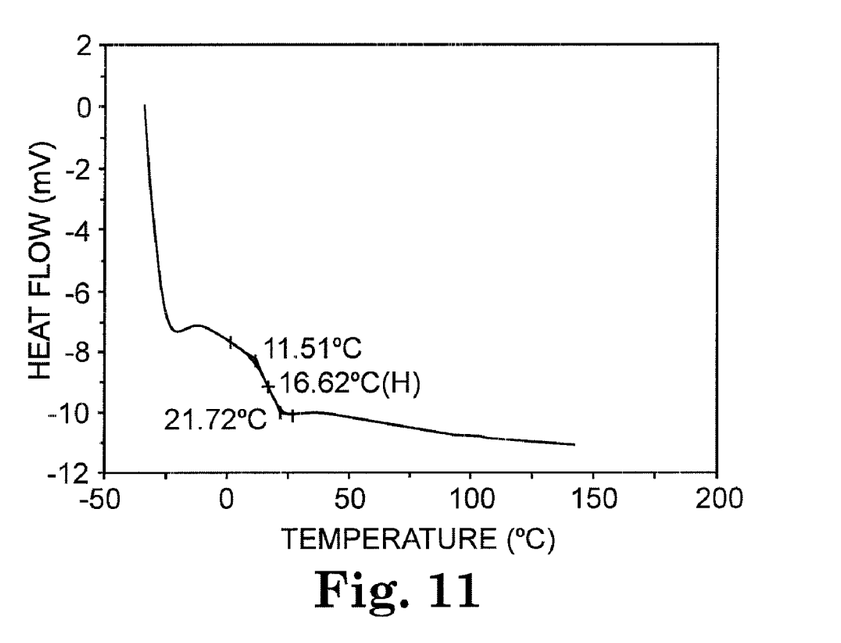

A single stage latex polymer was prepared using butyl acrylate, methyl methacrylate, methacrylic acid and acrylic acid. FIG. 11 shows the DSC curve, and demonstrates that the polymer exhibited a single Tg at about 16.6° C.

EXAMPLES 8-11

Multistage Latex Polymer Topcoat Compositions

In a mixing vessel equipped with a high-speed mixer and dispersion blade, the ingredients shown below in Table 2 were added in the listed order. Final topcoat compositions were formed by adding the first two ingredients, mixing for 5 minutes until homogeneous, adding the next 5 ingredients, mixing at high speed for 15 minutes, then adding the remaining 6 ingredients and mixing for 15 minutes using moderate agitation. Fiber cement siding boards with a moisture content of about 12% were topcoated with the resulting compositions and evaluated using the Visual Assessment of Crush Resistance scale described above and about 8 kg/cm² test pressure for 5 minutes. The results are shown in the last line of Table 2:

TABLE 2

| Ingredient | Example 8 | Example 9 | Example 10 | Example 11 |
|---|---|---|---|---|
| Water | 100 | 100 | 100 | 100 |
| Thickener[1] | 0.7 | 0.7 | 0.7 | 0.7 |
| Defoamer[2] | 1.5 | 1.5 | 1.5 | 1.5 |
| Coalescent[3] | 15 | 15 | 15 | 15 |
| Dispersant[4] | 7 | 7 | 7 | 7 |
| Pigment[5] | 217 | 217 | 217 | 217 |
| Extender[6] | 84 | 84 | 84 | 84 |
| Neutralizer[7] | 2 | 2 | 2 | 2 |
| Water | 8 | 8 | 8 | 8 |
| Example 1 latex | 626 | — | — | — |
| Example 2 latex | — | 580 | — | — |
| Example 3 latex | — | — | 580 | — |

TABLE 2-continued

| Ingredient | Example 8 | Example 9 | Example 10 | Example 11 |
|---|---|---|---|---|
| Example 4 latex | — | — | — | 580 |
| Water | 20 | 60 | 60 | 60 |
| Defoamer[8] | 1 | 1 | 1 | 1 |
| Thickener[9] | 1.5 | 1.5 | 1.5 | 1.5 |
| Crush Resistance | 3 | 4 | 3 | 3 |

[1]CELLOSIZE ™ QP 09L hydroxyethyl cellulose, available from Dow Chemical Company of Midland, MI.
[2]DEHYDRAN ™ 1620, available from Cognis Corporation of Cincinnati, OH.
[3]TEXANOL ™ ester alcohol, available from Eastman Chemical Company of Kingsport, TN.
[4]DISPERBYK ™ 190 block copolymer solution, available from Byk-Chemie USA of Wallingford, CT.
[5]TI-PURE ™ R902-28 titanium dioxide, available from E. I. DuPont de Nemours and Company of Wilmington, DE.
[6]ASP 170 aluminum silicate, available from Englehard Corporation of Iselin, NJ.
[7]Ammonium hydroxide, 26%, available from Aldrich Chemical
[8]BYK ™ 024 polysiloxane defoamer, available from Byk-Chemie USA of Wallingford, CT.
[9]ACRYSOL ™ RM-2020NPR hydrophobically modified ethylene oxide urethane block copolymer, available from Rohm and Haas Company of Philadelphia, PA.

As shown in Table 2, each of the final topcoat compositions provided a crush-resistant coating. These coatings should readily withstand storage at the bottom of at least a two pallet stack of coated boards.

COMPARISON EXAMPLES 12-14

Single Stage Latex Polymer Topcoat Compositions

In a mixing vessel equipped with a high-speed mixer and dispersion blade, the ingredients shown below in Table 3 were added in the listed order. Final topcoat compositions were formed by adding the first two ingredients, mixing for 5 minutes until homogeneous, adding the next 5 ingredients, mixing at high speed for 15 minutes, then adding the remaining 6 ingredients and mixing for 15 minutes using moderate agitation. Fiber cement siding boards with a moisture content of about 12% were topcoated with the resulting compositions and evaluated using the Visual Assessment of Crush Resistance scale described above and about 8 kg/cm² test pressure for 5 minutes. The results are shown in the last line of Table 3:

TABLE 3

| Ingredient | Comparison Example 12 | Comparison Example 13 | Comparison Example 14 |
|---|---|---|---|
| Water | 100 | 100 | 100 |
| Thickener[1] | 0.7 | 0.7 | 0.7 |
| Defoamer[2] | 1.5 | 1.5 | 1.5 |
| Coalescent[3] | 15 | 15 | 15 |
| Dispersant[4] | 7 | 7 | 7 |
| Pigment[5] | 217 | 217 | 217 |
| Extender[6] | 84 | 84 | 84 |
| Neutralizer[7] | 1 | 1 | 1 |
| Water | 8 | 8 | 8 |
| Comparison Example 5 latex | 570 | — | — |
| Comparison Example 6 latex | — | 526 | — |
| Comparison Example 7 latex | — | — | 533 |
| Water | 76 | 116 | 110 |
| Defoamer[8] | 1 | 1 | 1 |
| Thickener[9] | 1.5 | 1.5 | 1.5 |
| Crush Resistance | 2 | 1 | 2 |

[1]CELLOSIZE ™ QP 09L hydroxyethyl cellulose, available from Dow Chemical Company of Midland, MI.
[2]DEHYDRAN ™ 1620, available from Cognis Corporation of Cincinnati, OH.
[3]TEXANOL ™ ester alcohol, available from Eastman Chemical Company of Kingsport, TN.
[4]DISPERBYK ™ 190 block copolymer solution, available from Byk-Chemie USA of Wallingford, CT.

TABLE 3-continued

| Ingredient | Comparison Example 12 | Comparison Example 13 | Comparison Example 14 |
|---|---|---|---|

(5)TI-PURE ™ R902-28 titanium dioxide, available from E. I. DuPont de Nemours and Company of Wilmington, DE.
(6)ASP 170 aluminum silicate, available from Englehard Corporation of Iselin, NJ.
(7)Ammonium hydroxide, 26%, available from Aldrich Chemical
(8)BYK ™ 024 polysiloxane defoamer, available from Byk-Chemie USA of Wallingford, CT.
(9)ACRYSOL ™ RM-2020NPR hydrophobically modified ethylene oxide urethane block copolymer, available from Rohm and Haas Company of Philadelphia, PA.

As shown in Table 3, none of the comparison topcoat compositions provided a crush-resistant coating.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

We claim:

1. A method of making topcoated fiber cement articles, which method comprises:
    providing an unattached fiber cement board substrate having a first major surface;
    providing a topcoat coating composition comprising a multistage latex polymer having a soft stage Tg such that that the coating composition will coalesce at a Minimum Film Forming Temperature (MFFT) between about 0 and about 55° C. without requiring more than 10% Volatile Organic Compounds (VOCs) for acceptable film formation, and a hard stage Tg such that cement board substrates topcoated with the coating composition may be stacked without exhibiting evidence of crush damage;
    applying the coating composition to at least a portion of the first major surface;
    drying or otherwise hardening the coating composition to form a crush resistant final topcoat that is color change resistant when exposed outdoors; and wherein the final topcoat has a Crush Resistance value of at least 3 when two face-to-face coated embossed fiber cement board substrates are subjected to a pressure of about 6 kg/cm²; and
    stacking more than two of the thus-coated boards on a pallet or other horizontal supporting surface.

2. A method according to claim 1 further comprising applying a sealer or primer composition to the first major surface before applying the topcoat coating composition.

3. A method according to claim 1 further comprising placing a pair of the coated boards in face-to-face relationship with a protective liner between the coated surfaces.

4. A method according to claim 3 comprising stacking a plurality of such pairs on a pallet.

5. A method according to claim 4 comprising stacking a plurality of such pallets atop one another.

6. A method according to claim 1 wherein the final topcoat has a Crush Resistance value of at least 3 when two face-to-face coated embossed fiber cement board substrates are subjected to a pressure of about 8 kg/cm².

7. A method according to claim 1 wherein the final topcoat has a Crush Resistance value of at least 3 when two face-to-face coated embossed fiber cement board substrates are subjected to a pressure of about 10 kg/cm².

8. A method according to claim 1 wherein the coating composition will change less than 10 Macadam units following a 5 year vertical exterior exposure in Florida.

9. A method according to claim 1 wherein the multistage latex polymer has a gradient Tg.

10. A method according to claim 1 wherein the multistage latex polymer comprises at least one soft stage having a Tg less than about 40° C. and at least one hard stage having a Tg greater than about 40° C.

11. A method according to claim 1 wherein the multistage latex polymer comprises at least one soft stage having a Tg between about −65 and about 40° C. and at least one hard stage having a Tg between about 40 and about 230° C.

12. A method according to claim 1 wherein the multistage latex polymer comprises at least one soft stage having a Tg between about −15 and about 15° C. and at least one hard stage having a Tg between about 60 and about 105° C.

13. A method according to claim 1 wherein the multistage latex polymer comprises about 50 to about 90 wt. % soft stage polymer morphology and about 10 to about 50 wt. % hard stage polymer morphology based on the total multistage latex polymer weight.

14. A method according to claim 1 wherein the multistage latex polymer comprises about 60 to about 80 wt. % soft stage polymer morphology and about 20 to about 40 wt. % hard stage polymer morphology based on the total multistage latex polymer weight.

* * * * *

UNITED STATES PATENT AND TRADEMARK OFFICE
CERTIFICATE OF CORRECTION

| | |
|---|---|
| PATENT NO. | : 8,202,578 B2 |
| APPLICATION NO. | : 11/560329 |
| DATED | : June 19, 2012 |
| INVENTOR(S) | : T. Howard Killilea et al. |

It is certified that error appears in the above-identified patent and that said Letters Patent is hereby corrected as shown below:

On the Title Page,

Item (75) Inventors, lines 4-5, "William John Mittelsteadt" should read --John William Mittelsteadt--.

Item (56) References Cited, "6,762,230 B2 7/2004 Owens et al." should read --6,762,230 B2 6/2006 Brandenburger et al.--.

In the Specification,

Column 1, line 46, "marred of" should read --marred or--.

Column 12, line 58, "defoamer's" should read --defoamers--.

Signed and Sealed this
Ninth Day of June, 2015

Michelle K. Lee
*Director of the United States Patent and Trademark Office*